(12) United States Patent
Johnson

(10) Patent No.: US 6,173,947 B1
(45) Date of Patent: Jan. 16, 2001

(54) AUTOMOTIVE BUMPER STAND

(75) Inventor: Bryan T. Johnson, Vadnais Heights, MN (US)

(73) Assignee: Innovative Tools & Technologies, Inc., Vadnais Heights, MN (US)

(*) Notice: Under 35 U.S.C. 154(b), the term of this patent shall be extended for 0 days.

(21) Appl. No.: 09/165,733

(22) Filed: Oct. 2, 1998

Related U.S. Application Data (63) Continuation-in-part of application No. 08/626,050, filed on Apr. 1, 1996, now abandoned.

(51) Int. Cl.⁷ .................................................. B23Q 3/00
(52) U.S. Cl. .......................... 269/17; 269/69; 269/71; 269/51; 269/76; 269/296; 269/285
(58) Field of Search .................. 269/71, 17, 296, 269/69, 70, 285, 51, 45, 76; 254/133, 134, 8 B; 118/500

(56) References Cited

U.S. PATENT DOCUMENTS

| | | |
|---|---|---|
| 574,529 | 1/1897 | Elliott . |
| 783,031 | 2/1905 | Fell . |
| 1,833,355 | 11/1931 | Dahms . |
| 2,324,803 | 7/1943 | Snyder . |
| 2,459,080 | 1/1949 | Killius . |
| 2,793,425 | 5/1957 | Koban . |
| 2,799,920 | 7/1957 | Hansen . |
| 2,803,872 | 8/1957 | Massa . |
| 2,887,974 | 5/1959 | Weinfeld . |
| 2,976,033 | 3/1961 | Martin . |
| 2,995,357 | 8/1961 | Dennis et al. . |
| 3,220,565 | 11/1965 | Wells . |
| 4,029,308 | 6/1977 | Mathers . |
| 4,180,252 | 12/1979 | Cushenbery . |
| 4,183,511 | 1/1980 | Marek . |
| 4,221,368 | 9/1980 | Channel . |
| 4,531,720 | 7/1985 | Söder . |
| 4,676,491 | 6/1987 | Radlof . |
| 4,771,980 | 9/1988 | Dubbs et al. . |
| 4,848,759 | 7/1989 | Gardner . |
| 4,943,040 | 7/1990 | Finstad et al. . |
| 5,127,359 * | 7/1992 | Kannarie et al. ............. 118/500 |
| 5,135,205 | 8/1992 | Bédard . |
| 5,259,602 | 11/1993 | Rogos . |
| 5,294,098 | 3/1994 | Bundy . |
| 5,296,030 * | 3/1994 | Young ......................... 118/500 |

* cited by examiner

Primary Examiner—Robert C. Watson
(74) Attorney, Agent, or Firm—Dicke, Billig & Czaja, P.A.

(57) ABSTRACT

Apparatus for securing an automobile bumper during painting and repair. The apparatus includes a base support structure. A frame is coupled to the base support structure. A mechanism is provided for securing the bumper to the frame. Further, a mechanism is provided for adjusting the frame relative to the base support structure.

18 Claims, 10 Drawing Sheets

AUTOMOTIVE BUMPER STAND

This application is a CIP of Ser. No. 08/626,050 filed Apr. 1, 1996, now abandoned.

FIELD OF THE INVENTION

The present invention is an apparatus for use in the automotive industry. In particular, the present invention is an automotive bumper stand for securely retaining and positioning an automobile bumper for painting and repair.

BACKGROUND OF THE INVENTION

Past automobile bumpers were predominantly made of steel. The automobile industry has changed over from steel bumpers to predominantly plastic bumpers.

Known racks or stands do not lend themselves for painting and repair of plastic bumpers. Known racks, stands or supporting devices include those shown in the following U.S. Patents: U.S. Pat. No. 5,296,030 to Young (Painting Rack for Vehicle Parts); U.S. Pat. No. 4,676,491 to Radlof (Storable Work Stand); U.S. Pat. No. 4,180,252 to Cushenbery (Vehicle Door and Bumper Lift); U.S. Pat. No. 3,220,565 to Wells (Bumper Hoisting Fixture); U.S. Pat. No. 2,799,920 to Hansen (Automobile Door Tool); U.S. Pat. No. 2,793,425 to Koban (Welding Jig); U.S. Pat. No. 2,459,080 to Killius (Mechanic's Work Holding Table Furnished With Adjustable Work-Supporting Arms); and U.S. Pat. No. 783,031 to Fell (Pipe Supporting Device).

Plastic bumpers (or bumper shrouds) are very floppy and difficult to repair. With known stands, such as the rack shown in U.S. Pat. No. 5,296,030 to Young, the plastic bumpers simply lay on the stands or hang from the stands with nothing to securely support the bumper, including the bumper ends. When a technician needs to repair or sand the bumper shroud, the bumper shroud must be held securely with one hand while sanding with the other. Since machine sanding is the best way to sand these covers and two hands are required to operate the sander, additional help is needed to securely retain the bumper during the sanding process.

Known stands do not support the bumpers in the most desirable position for repair and painting. When held in an undesirable position, it is very difficult to get even and proper paint coverage during painting of the bumper.

Further, known stands do not work well with paint baking processes. During baking, as the bumpers are heated in excess of 180° F., the plastic bumpers begin to soften. Since the known stands do not provide support along the entire bumper, as the bumpers are heated, they begin to distort and lose their original shape, giving the bumpers a wavy look. If the bumpers distort too much, they may no longer fit on the automobile and must be replaced.

It is desirable to have a bumper stand which securely retains the entire bumper for painting and repair of the bumper. Further, it is desirable to have a bumper stand which allows the bumper to be adjustably positioned for optimum repair and painting of the bumper. Additionally, it is desirable to have a bumper stand which fully supports the automobile bumper during a paint baking process, such that it will retain its original shape.

SUMMARY OF THE INVENTION

The present invention is for use in automobile bumper repair. In particular, the present invention includes an apparatus for retaining an automobile bumper/bumper shroud during painting and repair of the bumper.

In one embodiment, the apparatus includes a base support structure. A frame is coupled to the base support structure. Means are provided for securing the bumper to the frame.

The apparatus may further include means for adjusting the frame relative to the base support structure. The means for adjusting the frame may adjust the frame between a generally horizontal position and a generally vertical position. The means for adjusting the frame relative to the base may include means for locking the frame in a desired position.

The means for securing the bumper to the frame may be adjustable. The means for securing the bumper to the frame may include an adjustable arm having a first end coupled to the frame and a second end coupled to an end of the bumper.

In another embodiment, the present invention includes an apparatus for securing an automobile bumper during painting and/or repair. The apparatus may include a base support structure. A frame for supporting the bumper is coupled to the base support structure. Means are provided for rotating the frame relative to the base support structure.

The frame for supporting the bumper may include a front portion and a rear portion, wherein the rear portion is generally flat and the front portion is curved. The base support structure may include a lower end and an upper end, wherein the frame is rotatably coupled to the base support structure proximate the upper end. The means for rotating the frame relative to the base support structure may rotate the frame between a generally horizontal position and a generally vertical position.

The means for rotating the frame relative to the base support structure may include means for locking the frame in a desired position relative to the base support structure. In one embodiment, the means for rotating the frame relative to the base support structure further includes means for rotatably coupling the frame to the base support structure. Means are provided for releasably locking the frame in a desired position relative to the base support structure.

The means for releasably locking the frame in a desired position relative to the base support structure may further include a spring loaded detent assembly. A detent release lever is coupled to the spring loaded detent assembly.

In another embodiment, the present invention includes an apparatus for securing an automobile bumper shroud during painting and/or repair. The apparatus includes a base support structure. A frame for supporting the bumper shroud is coupled to the base support structure. Means are provided for adjustably coupling the bumper shroud to the frame.

The means for adjustably coupling may include an adjustable crossbar movably coupled to the frame. The crossbar may include a first end and a second end, wherein a first adjustable extension member extends from the first end and a second adjustable extension member extends from the second end.

The apparatus may further include a first coupling arm extending from the first adjustable extension member and a second coupling arm extending from the second adjustable extension member. The first coupling arm and the second coupling arm may be generally rigid, flexible members.

The means for adjustably coupling may include an adjustable coupling arm having a first end coupled to the frame and a second end removably coupled to the bumper shroud. The coupling arm may be a generally rigid, flexible member. The frame includes a first end and second end, and may further include a bumper pad coupled to the first end.

The apparatus in accordance with the present invention securely retains the entire bumper for painting and repair of the bumper. The apparatus in accordance with the present invention allows the bumper to be adjustably positioned for optimum repair and painting of the bumper. Additionally, the apparatus in accordance with the present invention fully supports the bumper during a paint baking process, such that it will retain it's original shape.

BRIEF DESCRIPTION OF THE DRAWINGS

Other objects of the present invention and many attendant advantages of the present invention will be readily appreciated as the same becomes better understood by reference to the following detailed description when considered in connection with the accompanying drawings, in which the like reference numerals designate like parts throughout the figures thereof, and wherein.

DETAILED DESCRIPTION OF THE PREFERRED EMBODIMENTS

Figure 1:
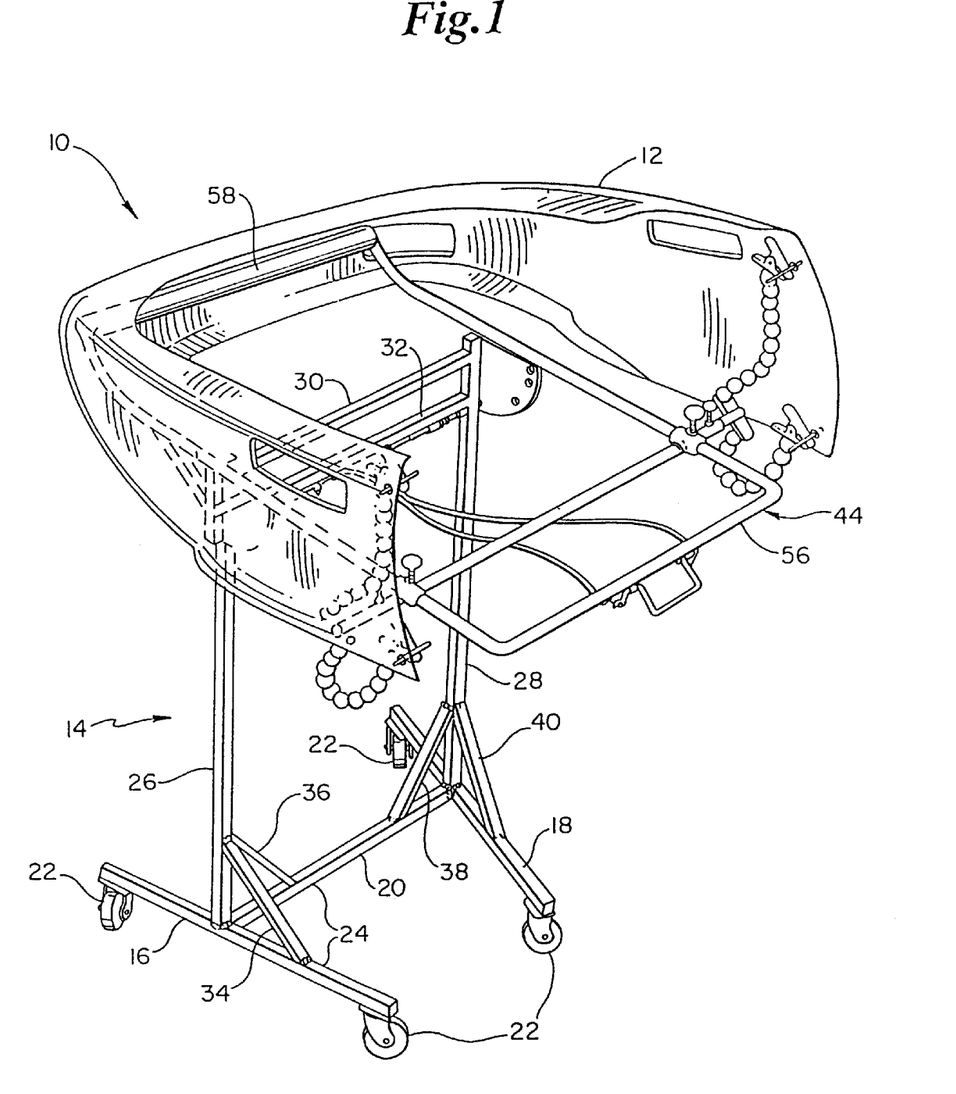
FIG. 1 is a perspective view showing the automotive bumper stand in accordance with the present invention in use with a typical bumper shroud work piece.

FIG. 1 shows an automotive bumper stand in accordance with the present invention generally at 10. A bumper shroud 12 is secured about the bumper stand 10 for repair and painting of the bumper shroud 12. The bumper stand 10 secures the bumper shroud 12 along each edge of the shroud 12. The bumper stand 10 is adjustable for positioning the bumper shroud 12 in an optimal position for efficient repair and painting.

Figure 2:
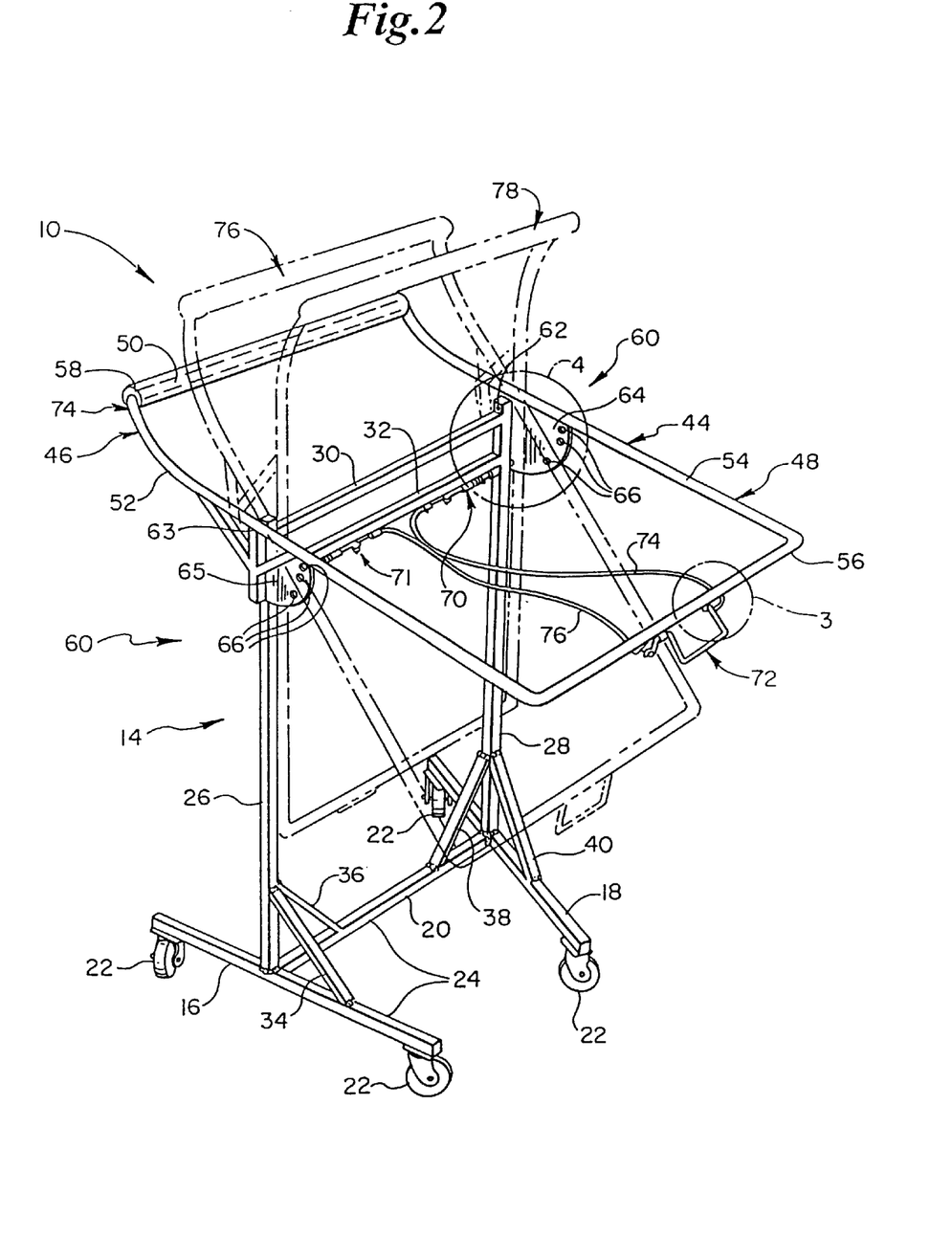
FIG. 2 is a perspective view of the bumper stand of FIG. 1 with the work piece removed and parts omitted for clarity.

Referring also to FIG. 2, the automotive bumper stand 10 includes base support system 14. In one preferred embodiment, the base support system 14 is of a welded construction and is generally formed of one inch tubular steel. It is recognized that base support system 14 may be formed of either metallic or nonmetallic structural members.

Base support system 14 generally includes a first foot 16 and a second foot 18. First foot 16 is coupled to second foot 18 at lower cross member 20. Located at each end of first foot 16 and second foot 18 are caster wheels 22 for moving automotive bumper stand 10. The caster wheels 22 may be lockable. In one embodiment, first foot 16 and second foot 18 are angled inward at a common end (on the rear side of stand 10), forming an acute angle with lower cross member 20, indicated at 24.

Figure 10:
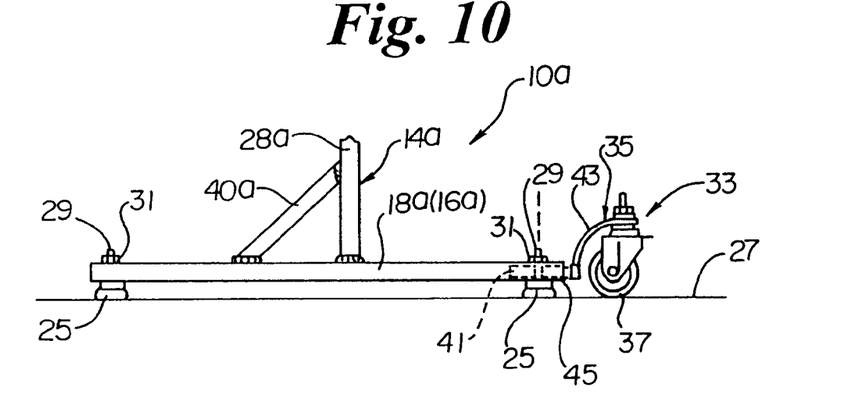
FIG. 10 is partial side elevational view of an alternative base support system for the stand in accordance with the present invention.
Figure 11:
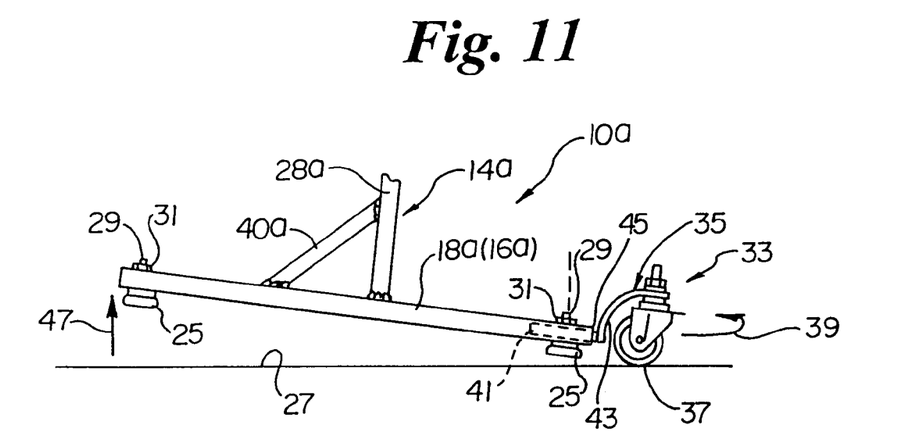
FIG. 11 is a partial side elevational view similar to FIG. 10 showing the alternative base support system of the stand tilted for transport.

FIGS. 10 and 11 illustrate an alternative base support system embodiment 14a for the automotive bumper stand 10a. Like parts are labeled with like numerals except for the addition of the subscript "a". In the alternative base support system 14a, the four caster wheels 22 of the base support system 14 have been replaced by four leg members 23. Two leg members 23 are positioned on the first foot 16a and two leg members 23 are positioned on the second foot 18a (only the second foot 18a being shown in FIGS. 10 and 11). The leg members 23 are located on the base support system 14a in the same place as the caster wheels 22 of the base support system 14. Each leg member 23 includes a pad portion 25 adapted to contact a surface, such as a shop floor 27, and a threaded element 29 adapted to extend through the respective first foot 16a and second foot 18a. The leg members 23 are secured to the first foot 16 and the second foot 18 by nuts 31 that are threadably received on the threaded elements 29. The pad portions 25 of the leg members 23 hold the bumper stand 10a stationary while the bumper stand 10a is in use or is being stored.

As seen in FIGS. 10 and 11, to move the bumper stand 10a over the shop floor 27, the base support system 14a includes a pair of caster wheel members 33. One caster wheel member 33 is positioned on the first foot 16a and one caster wheel member 33 is positioned on the second foot 18a (only the second foot 18a being shown in FIGS. 10 and 11). Each caster wheel member 33 includes a mounting bracket 35 and a wheel 37. The wheel 37 is adapted to swivel (i.e., rotate) relative to the bracket 35 as represented by directional arrow 39 (see FIG. 11). The mounting bracket 35 of each caster wheel member 33 includes a mounting lug portion 41 and a curved portion 43 to which the wheel 37 is swivel mounted. The mounting lug portion 41 of each caster wheel member 33 is adapted to be received within a rear open end 45 of the respective foot 16 and 18. The threaded element 29 of the leg member 23 extends through the mounting lug portion 41 to secure the caster wheel member 33 to the base support system 14a. To use the caster wheel members 33 to move the bumper stand 10a, a user need only tilt, as represented by directional arrow 47 (FIG. 11), the bumper stand 10a rearward until the leg members 23 no longer contact the shop floor 27, and the bumper stand 10a is only supported by the caster wheel members 33. The bumper stand 10a is then simply "wheeled" to a desired location.

Extending upward proximate the center of first foot 16 is standard 26. Extending upward proximate the center of second foot 18 is standard 28. At an opposite end, standard 26 is connected to standard 28 by upper cross member 30 and intermediate cross member 32. The resulting base support system 14 is generally rectangular shaped. Further, brace 34 extends between standard 26 and first foot 16, brace 36 extends between standard 26 and lower cross member 20, brace 38 extends between standard 28 and lower cross member 20, and brace 40 extends between standard 28 and second foot 18 for providing additional structural support and structural integrity to base support system 14.

Bumper shroud 12 secures about frame 44. Frame 44 is generally rectangular shaped and includes a front side 46 and a rear side 48. In one embodiment, the frame 44 is formed of a ¾ inch rigid steel tubular member. It is recognized that frame 44 may be formed of metallic or nonmetallic structural members.

Frame 44 is generally rectangular shaped. The frame 44 includes front bar 50 (shown dashed), left side bar 52, right side bar 54, and rear bar 56. Left side bar 52 and right side bar 54 extend between front bar 50 and rear bar 56. On rear side 48, left side bar 52 and right side bar 54 are generally straight. On front side 46, front left side bar 52 and right side bar 54 gently curve upward to front bar 50. Pad 58 is located along front bar 50. As bumper shroud 12 is tensioned against front bar 50, pad 58 further protects bumper shroud 12 from possible damage.

Frame 44 is rotatable and adjustable about base support system 14. Specifically, the position of frame 44 (including front bar 50) is fully adjustable relative to the base support system 14. In one embodiment, frame 44 is fully adjustable between a generally horizontal and a generally vertical position. To adjust or rotate the frame 44 relative to base support system 14, the present invention includes means for adjusting or adjustment system 60. In one embodiment, adjustment system 60 generally includes pivot pins 62 and 63, selector plates 64 and 65 having detent holes 66, spring-loaded detent assemblies 70 and 71, and a detent release lever 72. Frame 44 pivots about base support system 14 at pivot pins 62 and 63. By operating detent release lever 72, cable 74 and cable 76 are coupled to the spring-loaded detent assembly 70 and assembly 71 for selecting various frame positions using detent holes 66 of the selector plates 64 and 65. In the embodiment shown, frame 44 may be secured at and is moveable between a first generally horizontal position indicated at 75, an intermediate position indicated at 77, and a generally vertical position indicated at 78 (which correspond to locations of detent holes 66 in selector plates 64 and 65).

Figure 3:
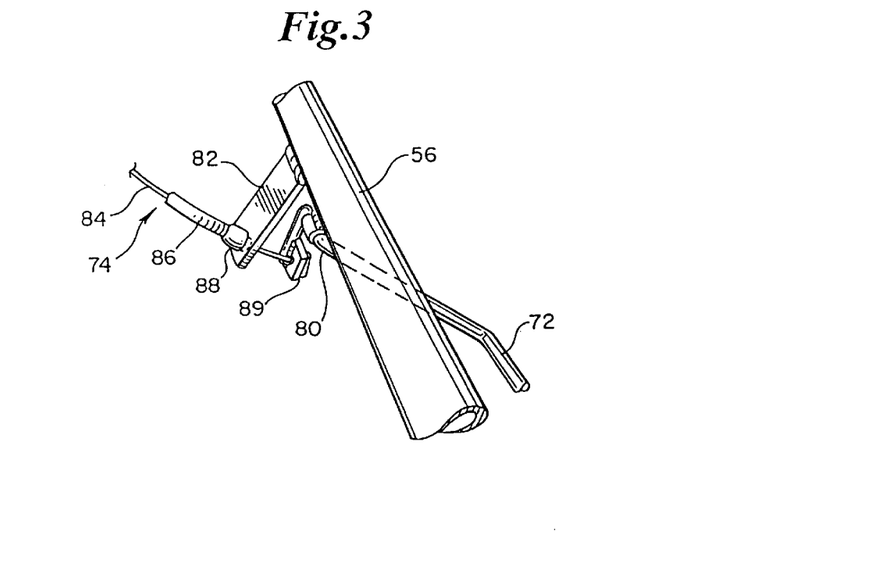
FIG. 3 is an enlarged fragmentary perspective view taken from the area encircled at 3 in FIG. 2 and viewed from an angle, wherein the invention is rotated approximately 90° counterclockwise.

Referring to FIG. 3, detent release lever 72 extends through tubular journal 80, which is coupled or welded to rear bar 56. Cable mounting blade 82 (also coupled to rear bar 56) supports flexible cable 84 from rear bar 56 for operation by detent release lever 72. Flexible cable 84 extends from cable housing 86 end fitting 88, through cable mounting blade 82, through the end of detent release lever 72, terminating at cable swage 89. By operation of detent release lever 72, flexible cable 84 is pulled relative to cable housing 86, for operation of the spring-loaded detent assembly 70. Cable 76 operates spring-loaded detent assembly 71 in a similar fashion.

Figure 4:
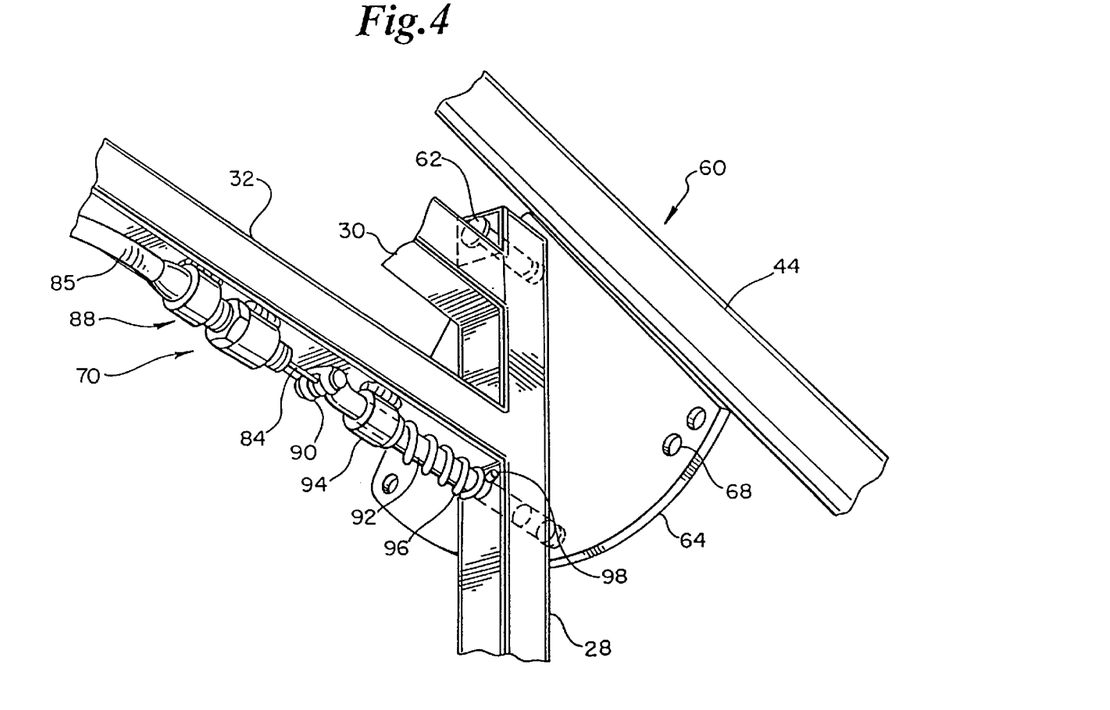
FIG. 4 is an enlarged fragmentary perspective view taken from the area encircled at 4 in FIG. 2 and viewed from an angle wherein the invention is rolled approximately 90° bottom forward to show detail from below.

Referring to FIG. 4, the left side of adjustment system 60 is shown and will be described herein. The right side of adjustment system 60 operates in a similar way. Pivot pin 62 extends through standard 28 and is mounted to selector plate 64. Selector plate 64 is coupled to frame 44. Spring-loaded detent assembly 70 is coupled to base support system 14 at intermediate cross bar 32. Spring-loaded detent assembly 70 includes cable housing 85 coupled to housing adjustment 88. Flexible cable 84 extends to and terminates at swage claw 90. Swage claw 90 is coupled to bolt 92. Bolt 92 extends through tube 94 and may extend through a corresponding hole in standard 28. Bolt 92 also extends through compression spring 96, which is compressed between tube 94 and pin 98.

In operation, the position of frame 44 is adjusted relative to base support system 14 by first operating detent release lever 72. By holding down detent release lever 72, bolt 92 is withdrawn from the selected selector plate 64 detent hole 66. Frame 44 may then be rotated about pivot pin 62 until the desired detent hole 66 lines up with the hole in standard 28. By releasing the detent release lever 72, compression spring 96 pushes bolt 92 forward to engage the next or desired detent hole 66. Since detent release lever 72 operates a dual cable system, similarly, the corresponding detent hole 66 is selected in selector plate 65, and the position of frame 44 is adjusted relative to base support system 14 using one single motion.

Figure 5:
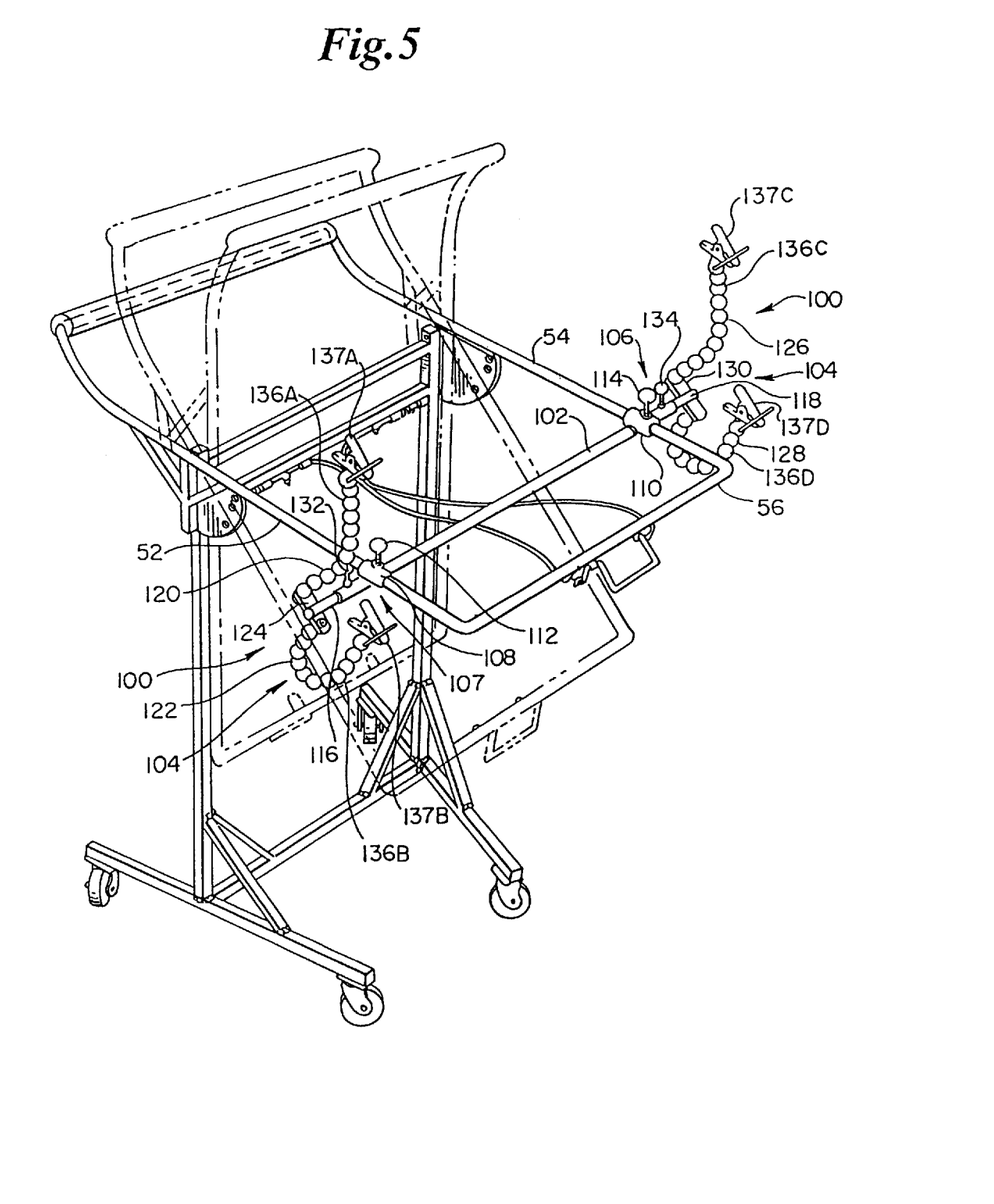
FIG. 5 is another perspective view of the bumper stand in accordance with the present invention.

Referring to FIG. 5, bumper stand 10 further includes shroud locking assembly 100, which couples bumper shroud 12 to frame 44. In one preferred embodiment, shroud locking assembly 100 is adjustable for various bumper shroud sizes, and includes cross bar 102 and arm system 104. Cross bar 102 is generally parallel to rear bar 56 and extends beyond side bar 52 and side bar 54. Cross bar 102 is adjustable relative to rear bar 56 by sliding cross bar 102 along side bar 52 and side bar 54.

The cross bar adjustment systems 106 and 107 include a cross bar slide 108, cross bar slide 110, corresponding cross bar locking screw 112, and cross bar locking screw 114. Side bar 52 passes through cross bar slide 108, and side bar 54 passes through cross bar slide 110. Cross bar slide 108 and cross bar slide 110 are coupled to cross bar 102. With the above described cross bar adjustment systems 106 and 107, the position of cross bar 102 may be adjustable relative to rear bar 56 to conform to various sized automobile bumper shrouds. Once in a desired position, cross bar 102 may be locked in place by tightening cross bar locking screw 112 against side bar 52 and tightening cross bar locking screw 114 against side bar 54. It is recognized other methods may be used for securing cross bar 102.

Extending from opposite ends of cross bar 102 is clamp extension shaft 116 (left end) and clamp extension shaft 118 (right end). Arm system 104 is coupled to the end of clamp extension shaft 116 and clamp extension shaft 118. In one embodiment, flexible arm 120 and flexible arm 122 are coupled to clamp extension shaft 116 using mounting ear 124, and flexible arm 126 and flexible arm 128 are coupled to clamp extension shaft 118 using mounting ear 130. Clamp extension shaft 116 and clamp extension shaft 118 allow cross bar 102 to be adjustable beyond side bar 52 and side bar 54 to accommodate and adjust for different sized bumper shrouds. Clamp extension shaft 116 is releasibly locked in place using extension lock 132, and clamp extension shaft 118 is releasibly locked in place using extension lock 134.

Figure 6:
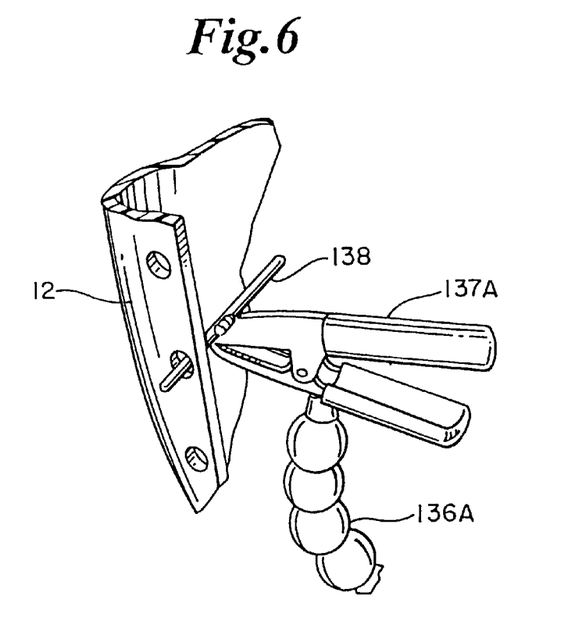
FIG. 6 is an enlarged fragmentary detail of one locking assembly application used in accordance with the present invention.
Figure 7:
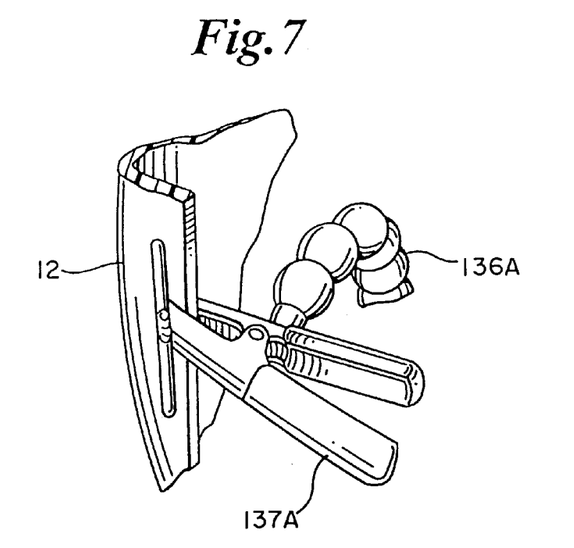
FIG. 7 is an enlarged fragmentary detail of another locking assembly application in accordance with the present invention.

Arm system 104 allows different sized bumper shrouds to be locked in place about frame 44. Each flexible arm 120, 122, 126 and 128 may include a generally flexible body (labeled 136A, 136B, 136C, and 136D) which is coupled at one end to mounting ear 124 or mounting ear 130, respectively. At the other end, the flexible arms include a locking member (labeled 137A, 137B, 137C, and 137D) for securing the bumper shroud 12 to the flexible arms 120, 122, 126 and 128. Referring to FIG. 6, locking members 137A, 137B, 137C and 137D may each be an alligator clamp having a pin 138 secured to its clamping end for passing through holes in the edges of the bumper shroud 12 to support the bumper shroud 12. Referring to FIG. 7, alternatively, the locking members 137A, 137B, 137C and 137D may be clamped directly on the bumper shroud 12. Flexible arm 120 is illustrated with particularity in FIG. 9, with the understanding that the flexible arms 122, 126 and 128 are of like structure. Each flexible arm 120, 122, 126 and 128 is independently adjustable (i.e., independent of each other) within a three-dimensional space. While flexible and adjustable, each arm is capable of maintaining the bumper shroud at the adjusted position (or desired position).

Figure 9:
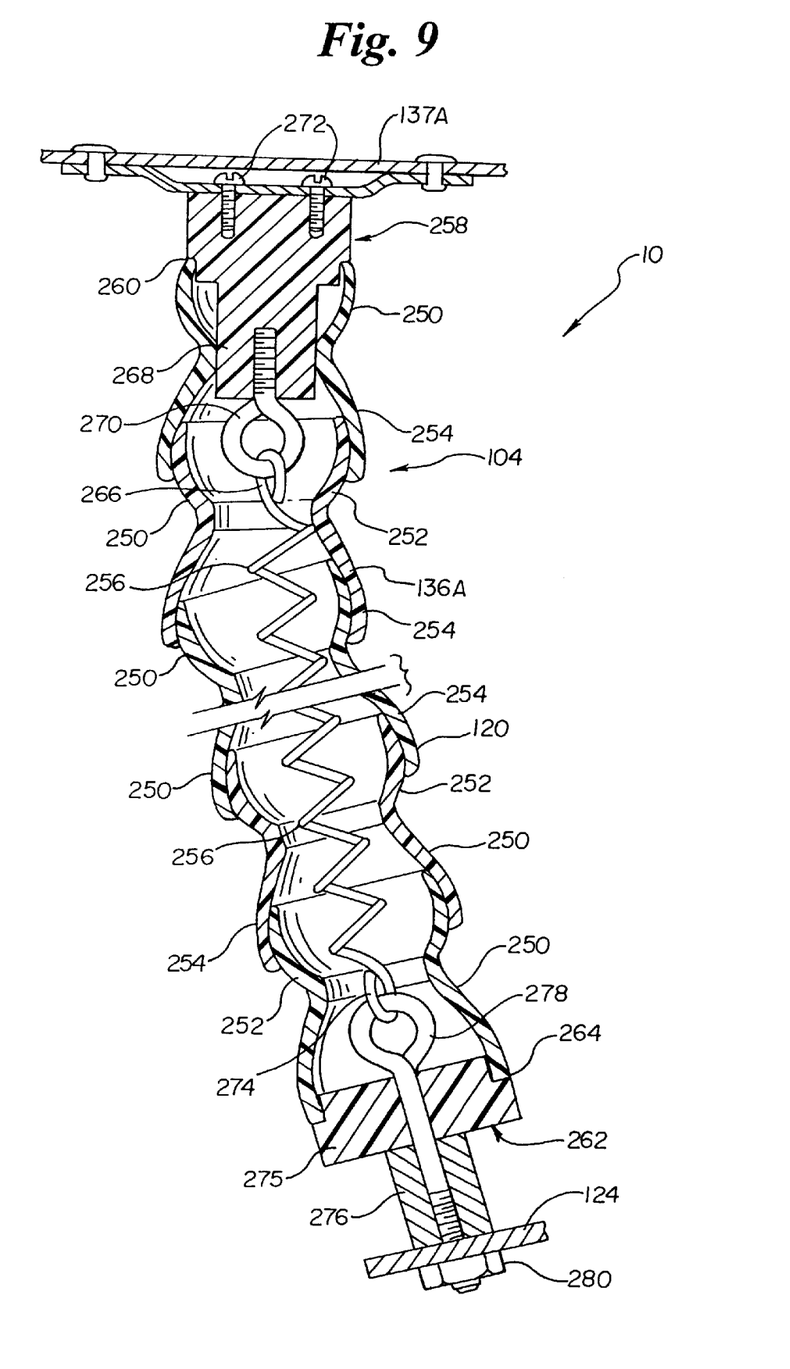
FIG. 9 is a cross sectional view illustrating components of a flexible arm forming part of an arm system shown in FIG. 5.

As seen in FIG. 9, the generally flexible body 136A of the flexible arm 120 is defined by a plurality of swivel joint, interlocking fasteners 250. Each swivel joint fastener 250 includes a ball portion 252 and a tapered skirt socket portion 254. The socket portion 254 of one fastener 250 is adapted to receive the ball portion 252 of an adjoining fastener 250 to secure the fasteners 250 together in an interlocking manner. Multiple fasteners 250 are secured together in this manner to form a line (i.e., chain) of interlocking fasteners 250. The swivel joint connection (also referred to as a ball joint connection) defined by the mating, adjoining ball and socket portions 252 and 254 allow adjoining fasteners 250 to both rotate and pivot relative to one another. This allows the flexible body 136A, defined by the line of fasteners 250, to be bent (i.e., flexed) into different shapes and configurations to accommodate bumper shrouds 12 of different sizes. Suitable fasteners 250 used to form the flexible body 136A are LOC-LINE® modular hose system fasteners commercially available from Lockwood Products, Inc. of Oswego, Oreg.

To maintain the desired bent or flexed configuration or shape of the flexible body 136A under an increased load, a tensioning member or means is provided. Such means maintains the desired shape of the flexible member when the load is attached to the flexible arm (e.g., the automobile bumper). In one embodiment, the flexible arm 120 further includes a spring 256 secured in tension between a first mounting assembly 258 at a first end 260 of the flexible body 136A, and a second mounting assembly 262 at a second end 264 of the flexible body 136A. A first end 266 of the spring 256 is secured to a mounting block 268 of the first mounting assembly 258 via a threaded eye bolt 270. Screws 272 are threadably received by the mounting block 268 to secure the locking member 137A to the flexible body 136A of the flexible arm 120. A second end 274 of the spring 256 is secured through mounting blocks 275 and 276 of the second mounting assembly 262 via a threaded eye bolt 278 which is secured to the mounting ear 124 via a nut 280. The tensioned spring 256 adds structural stiffness to the flexible body 136A so that the flexible body 136A can maintain the desired bent or flexed configuration or shape under the weight (i.e., load) of the bumper shroud 12.

Figure 8:
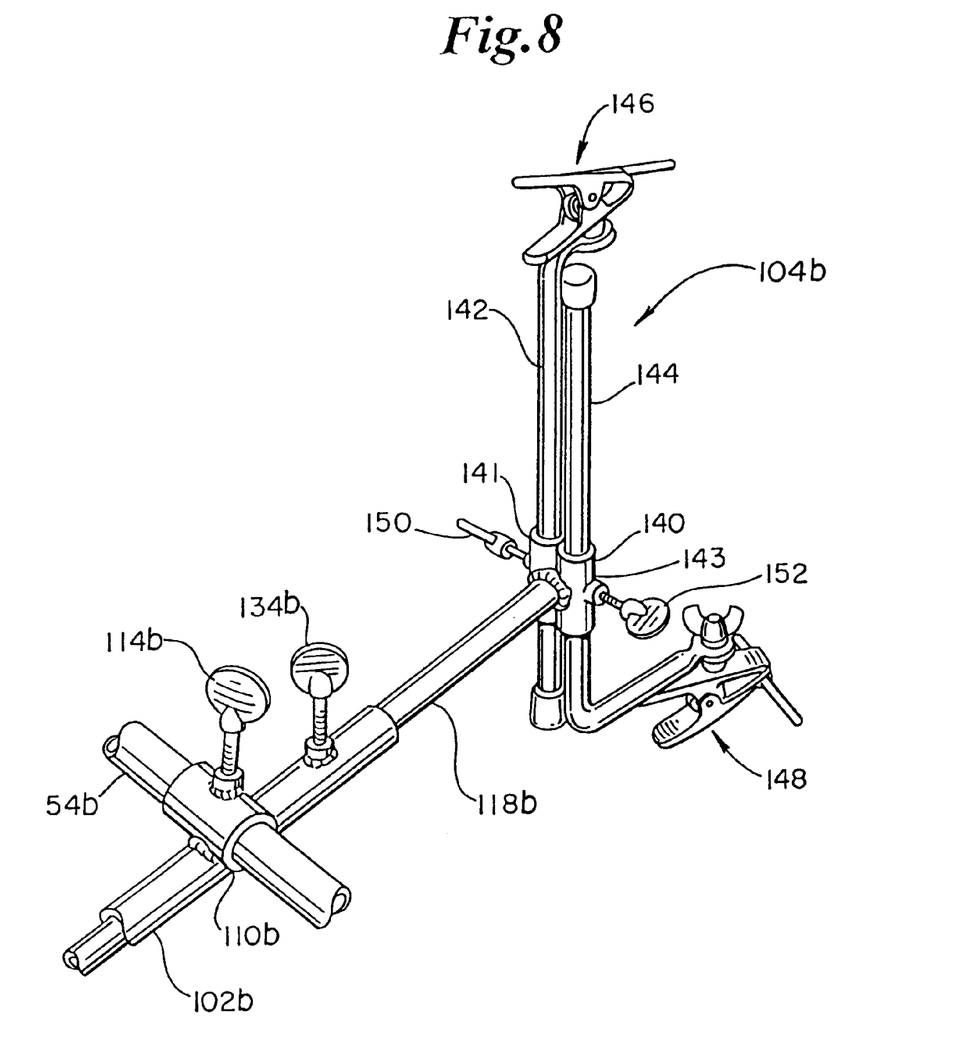
FIG. 8 is an enlarged fragmentary view of another locking assembly application in accordance with the present invention.

Referring to FIG. 8, an alternative arm system embodiment 104b is shown. Like parts are labeled with like numerals except for the addition of the subscript "b". In this embodiment, arm system 104b is a generally rigid, yet vertically adjustable arm system. The arm system 104b includes a twin sleeve 140 secured or welded to the end of extension shaft 118b. Twin sleeve 140 is formed of two generally short tubular members 141 and 143. Passing through the first tubular member 141 is a rigid stem 142, and passing through the second tubular member 143 is a rigid stem 144. Coupled to one end of rigid stem 142 is locking member 146 (similar to locking members 137A, 137B, 137C and 137D), and coupled to an opposite end of rigid stem 144 is another locking member 148 (also similar to locking members 137A, 137B, 137C and 137D). In this embodiment, arm system 104b including rigid stem 142 and rigid stem 144 may be adjustable vertically to conform to different sized bumper shrouds 12 using locking screw 150 and locking screw 152 which pass through twin sleeve 140 to tension against rigid stem 142 and rigid stem 144, respectively.

Figure 12:
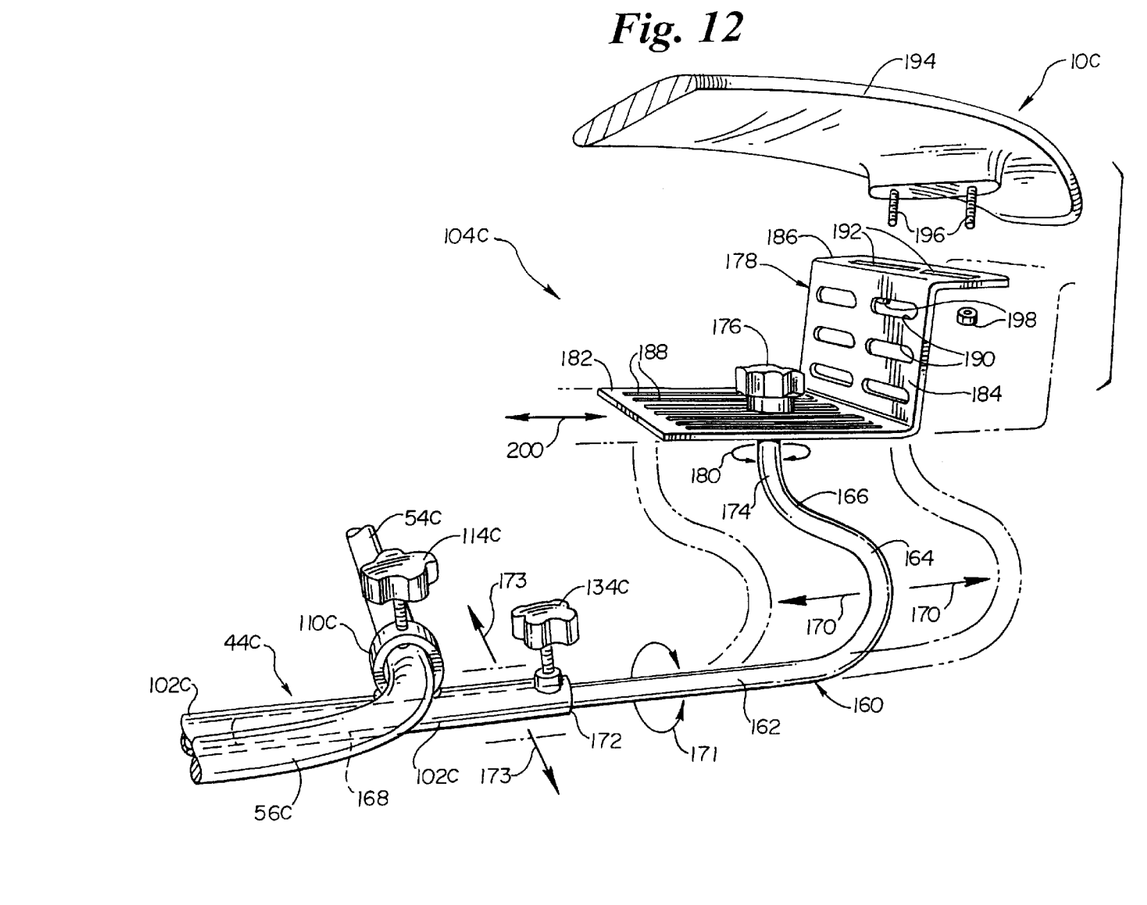
FIG. 12 is a perspective view of a Z-shaped bracket assembly used in conjunction with the stand in accordance with the present invention.

Referring to FIG. 12, an alternative arm system embodiment 104c is shown. Like parts are labeled with like numerals except for the addition of the subscript "c". In addition, only the right side alternative arm system 104c is depicted in FIG. 12, and is described with particularity, however, it is understood that a mirror image alternative arm system 104c would also be located on the left side of the bumper stand 10c. In this alternative embodiment arm system 104c, the relatively straight extension shafts 116 and 118 of the arm systems 104 have been replaced by contoured extension shafts 160. The contoured extension shaft 160 is defined by a straight shaft portion 162, a semi-circular shaped shaft portion 164 and a curved shaft portion 166. The free end 168 of the straight shaft portion 162, of the contoured extension shaft 160, is adjustably received in an open right end 172 of the cross bar 102c. The contoured extension shaft 160 is both linearly adjustable, as represented by the directional arrows 170, and rotatably adjustable, as represented by directional arrow 171, relative to the cross bar 102c. This allows independent adjustability of each arm within a three-dimensional space. The contoured extension shaft 160 is held in a desired position by the extension lock 134c. The cross bar 102c is linearly adjustable (as represented by the directional arrows 173) relative to the rear bar 56c in the same way as was previously described in connection with the cross bar 102 (i.e., via the cross bar slides 108 and 110 and the cross bar locking screws 112 and 114).

Figure 12A:
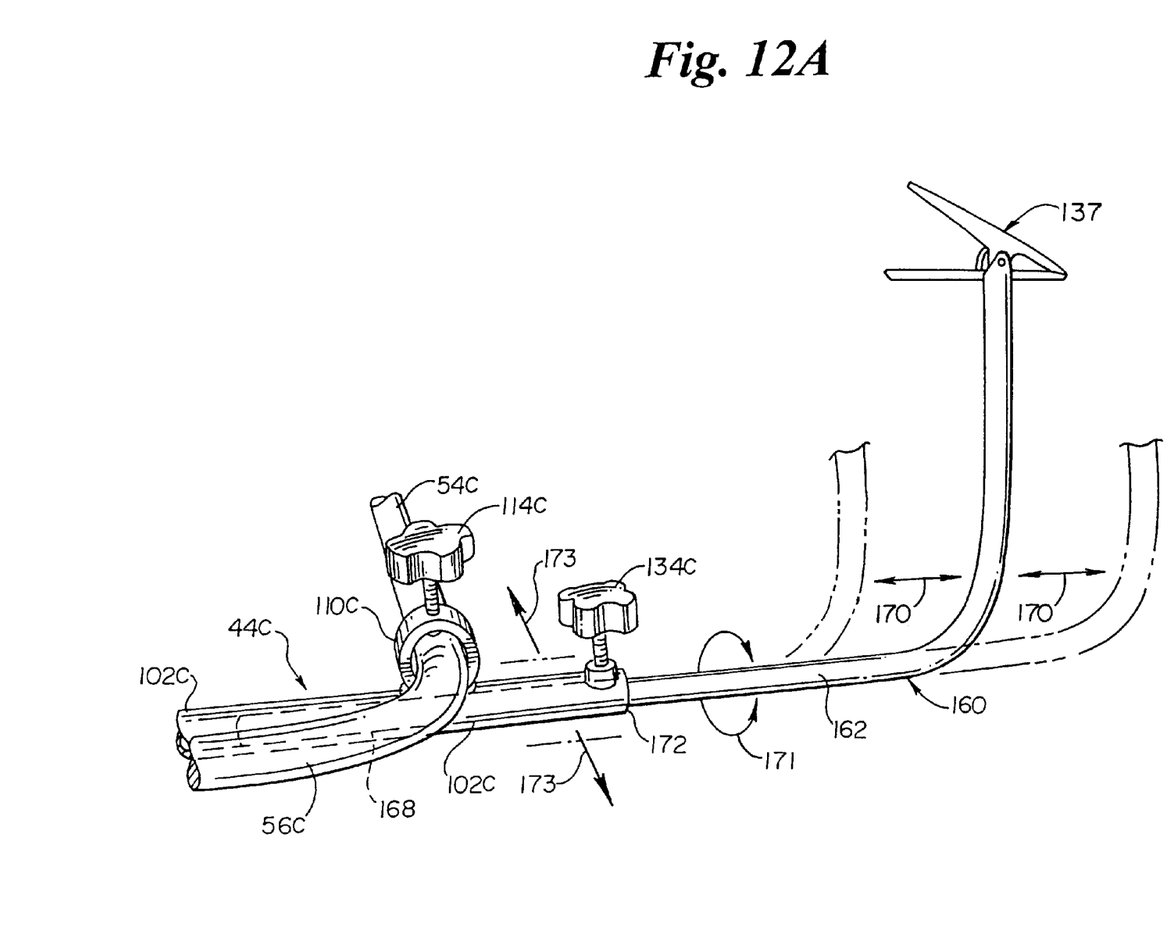
FIG. 12A is a perspective view of another exemplary embodiment of a locking assembly for the stand in accordance with the present invention.

The free end 174 of the curved shaft portion 166 of the contoured extension shaft 160 is adapted to threadably receive a threaded locking knob 176, for adjustably securing a Z-shaped mounting bracket 178 to the extension shaft 160. The Z-shaped mounting bracket 178 is part of the alternative arm system 104c and includes a base portion 182, an intermediate portion 184, which is perpendicular to the base portion 182, and a flange portion 186, which is perpendicular to the intermediate portion 184. The base portion 182 includes a plurality of slots 188, the intermediate portion 184 includes a plurality of slots 190, and the flange portion 186 includes a plurality of slots 192. As seen in FIG. 12, the threaded locking knob 176 extends through one of the slots 188 of the base portion 182 to secure the Z-shaped mounting bracket 178 to the extension shaft 160. However, it is to be understood that the threaded locking knob 176, could pass through any of the slots 188, 190 and 192, to secure the Z-shaped mounting bracket 178 to the extension shaft 160 in different orientations, so as to accommodate different sized automotive body parts or other automobile panels, such as a spoiler 194, for repair and painting. In FIG. 12, threaded fasteners 196 of the spoiler 194 are shown extending through the slots 192 of the flange portion 186 to be secured by nuts 198. The Z-shaped mounting bracket 178 is rotatably adjustable, as represented by directional arrow 180, and is linearly adjustable, as represented by directional arrow 200, relative to the extension shaft 160 to accommodate spoilers 194 of different sizes and shapes. Referring to FIG. 12A, arm system 104c can include a tubular shaft comprising substantially a "right-angle" or single bend shape. As shown, the shaft end is adapted to be secured to locking member 137 as previously described herein.

In operation, and referring to FIG. 1, the bumper shroud 12 is positioned against pad 58 on front bar 50, and is secured against frame 44 at the bumper ends using arm system 104. Cross bar adjustment systems 106 and 107 allow cross bar 102 to be adjusted relative to rear bar 56 to the size of the bumper shroud 12. Similarly, clamp extension shaft 116 and clamp extension shaft 118 are adjustable to the size (width) of bumper shroud 12. In the embodiment shown, flexible arms 120, 122, 126 and 128 are manually bent to the desired position, and locking members 137A, 137B, 137C and 137D are inserted through holes located at the end of the bumper shroud 12. Alternatively, the locking members 137A, 137B, 137C and 137D are clamped directly to the inside of the bumper shroud 12. By adjusting arm system 104, bumper shroud 12 is locked and tightened securely against frame 44.

Bumper shroud 12 is now secured on stand 10 for painting and repair. In the embodiment shown, by operation of detent release lever 72, as previously described herein, by rotating frame 44 (including bumper shroud 12) relative to base support system 14, bumper shroud 12 may be positioned in a generally horizontal position (75), an intermediate position (77), or a generally vertical position (78) as desired for painting and repair of bumper shroud 12.

Since base support system 14 includes caster wheels 22, bumper stand 10 may be moved between repair stations and painting areas for repair and painting of bumper shroud 12. Further, since the ends of bumper shroud 12 are securely retained in a normal position, to frame 44, bumper shroud 12 will retain its original shape during exposure to high heat in a paint baking process.

It will be understood that this disclosure is, in many respects, only illustrative. Changes may be made in details, particularly in matters of shape, size, material, and arrangement of parts, without exceeding the scope of the invention. It is recognized that other techniques may be used for locking the bumper shroud 12 to the stand 10, and for adjusting the stand 10, within the scope of the present invention. Accordingly, the scope of the invention is as defined in the language of the appended claims.

What is claimed is:

1. An apparatus for securing an automobile bumper during painting and repair, the apparatus comprising:
    a base support structure;
    a frame coupled to the base support structure; and
    means for releasably securing the bumper to the frame, wherein the means for securing the bumper to the frame includes:
        at least one adjustable arm including a flexible member that is adapted to be flexed to a desired shape by a user, wherein the flexible member of the at least one adjustable arm includes a first end coupled to the frame and a second end releasably coupled to an end of the bumper; and
        means for maintaining the desired shape of the flexible member when the automobile bumper is secured to the securing means, the means for maintaining the desired shape including:
            a resilient element secured in tension between the first and second ends of the flexible member, the resilient element giving the flexible member of the at least one adjustable arm structural stiffness to support the bumper.

2. The apparatus of claim 1, and further including:
    means for adjusting the frame relative to the base support structure.

3. The apparatus of claim 2 wherein the adjusting means adjusts the frame between a generally horizontal position and a generally vertical position.

4. The apparatus of claim 2 wherein the means for adjusting the frame relative to the base support structure includes means for locking the frame in a desired position relative to the base support structure.

5. The apparatus of claim 1 wherein the flexible member of the at least one adjustable arm is defined by a plurality of swivel joint, interlocking fasteners secured together in a line.

6. The apparatus of claim 5 wherein each of the fasteners includes a ball portion and a socket portion, and wherein the socket portion of one fastener is adapted to receive the ball portion of another adjoining fastener, to form a ball joint connection for securing the fasteners together in an interlocking manner, the ball joint connection allowing adjoining fasteners to both pivot and rotate relative to one another.

7. The apparatus of claim 1 wherein the resilient element is a spring.

8. The apparatus of claim 1, and further including:
    a coupling mechanism coupled to the second end of the flexible member of the at least one adjustable arm, the coupling mechanism including a pin member extending therefrom, wherein the pin member is sized for passing through a hole in the bumper.

9. The apparatus of claim 1 wherein the at least one adjustable arm includes a plurality of adjustable arms, each adjustable arm of the plurality adjustable arms being capable of releasably securing the bumper to the frame.

10. The apparatus of claim 9, and further including:
    means for supporting the base support structure during painting and repair of the bumper; and
    means, separate from the supporting means, for allowing a user to transport the apparatus across a surface.

11. The apparatus of claim 10 wherein the supporting means includes, a plurality of leg members for engaging the surface to maintain the base support structure in a fixed position during painting and repair of the bumper; and wherein the means for allowing a user to transport the apparatus includes, a pair of spaced caster wheel members positioned at one end of the base support structure, the caster wheel members allowing a user to tilt the base support structure onto the caster wheel members and off of the leg members to transport the apparatus.

12. An apparatus for securing an automobile bumper shroud during painting and/or repair, the bumper shroud having a front portion and side portions and having an interior surface and an exterior surface, the apparatus comprising:
    a base support structure;
    a frame for supporting the bumper, coupled to the base support structure, the frame being adapted to support the bumper shroud at said front and side portions substantially from within said interior surface, such that said bumper shroud exterior surface is substantially unobstructed, wherein the frame for supporting the bumper shroud includes a front portion and a rear portion, wherein the rear portion is generally flat and the front portion is curved, wherein the curved front portion of the frame is adapted to support the bumper shroud from within said interior surface, and wherein said bumper shroud includes a top edge and a bottom edge and said apparatus is adapted to support said bumper shroud sides without requiring the frame to support the bumper shroud along either of the top or bottom edges; and
    means for rotating the frame relative to the base support structure between a generally horizontal position and a generally vertical position.

13. The apparatus of claim 12, wherein the base support structure includes a lower end and an upper end, wherein the frame is rotatably coupled to the base support structure proximate the upper end.

14. The apparatus of claim 12 wherein the means for rotating the frame relative to the base support structure includes means for locking the frame in a desired position relative to the base support structure.

15. An apparatus for securing an automobile body part during painting and/or repair, the body part having a front portion and side portions and having an interior surface and an exterior surface, the apparatus comprising:

a base support structure;

a frame for supporting the body part movably coupled to the base support structure, wherein the frame includes a front portion and a rear portion, wherein the rear portion is generally flat and the front portion is curved, wherein the curved front portion of the frame is adapted to support the body part from within said interior surface, and wherein said body part includes a top edge and a bottom edge and said apparatus is adapted to support said body part sides without requiring the frame to support the body part along either of the top or bottom edges; and means for adjustably coupling the body part to the frame including:

at least one adjustable coupling arm, the at least one adjustable coupling arm including:

an extension member movably adjustable relative to the frame; and a bracket member movably adjustable relative to the extension member, the bracket member having means allowing the body part to be releasably secured thereto.

16. The apparatus of claim 15 wherein the bracket member includes:

a first portion, a second portion substantially perpendicular to the first portion; and a third portion generally perpendicular to the second portion.

17. The apparatus of claim 16 wherein the means for allowing the body part to be releasably secured to the bracket member includes a plurality of slots in each of the first, second and third portions of the bracket member.

18. An apparatus for securing an automobile bumper during painting and repair, the apparatus comprising:

a base support structure;

a frame coupled to the base support structure; and means for releasably securing the bumper to the frame, wherein the means for securing the bumper to the frame includes:

at least one adjustable arm including a flexible member that is adapted to be flexed to a desired shape by a user, wherein the flexible member of the at least one adjustable arm includes a first end coupled to the frame and a second end releasably coupled to an end of the bumper;

a coupling mechanism coupled to the second end of the flexible member of the at least one adjustable arm, the coupling mechanism including a pin member extending therefrom, wherein the pin member is sized for passing through a hole in the bumper; and means for maintaining the desired shape of the flexible member when the automobile bumper is secured to the securing means.

* * * * *